United States Patent
Zhao et al.

(10) Patent No.: US 12,352,353 B2
(45) Date of Patent: Jul. 8, 2025

(54) DUAL-MOTOR COUPLING DRIVING SYSTEM AND CONTROL METHOD THEREFOR

(71) Applicant: BIT HUACHUANG ELECTRIC VEHICLE TECHNOLOGY CO., LTD., Beijing (CN)

(72) Inventors: Mingjie Zhao, Beijing (CN); Cheng Lin, Beijing (CN); Junhui Shi, Beijing (CN)

(73) Assignee: BIT HUACHUANG ELECTRIC VEHICLE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/555,541

(22) PCT Filed: Nov. 24, 2022

(86) PCT No.: PCT/CN2022/133953
§ 371 (c)(1),
(2) Date: Oct. 16, 2023

(87) PCT Pub. No.: WO2023/151344
PCT Pub. Date: Aug. 17, 2023

(65) Prior Publication Data
US 2024/0209936 A1    Jun. 27, 2024

(30) Foreign Application Priority Data
Feb. 14, 2022    (CN) .......................... 202210133341.0

(51) Int. Cl.
*F16H 61/68*    (2006.01)
*B60K 1/02*    (2006.01)
(Continued)

(52) U.S. Cl.
CPC .............. *F16H 61/688* (2013.01); *B60K 1/02* (2013.01); *B60L 15/20* (2013.01); *F16H 3/006* (2013.01);
(Continued)

(58) Field of Classification Search
CPC ........ F16H 61/688; F16H 3/006; F16H 3/093; F16H 61/0403; F16H 2003/0933;
(Continued)

(56) References Cited

U.S. PATENT DOCUMENTS

2020/0346636 A1    11/2020    Trinkenschuh et al.
2021/0170883 A1*    6/2021    Hu ........................... B60K 1/02

FOREIGN PATENT DOCUMENTS

CN    106763552 A    5/2017
CN    110303863 A    10/2019
(Continued)

OTHER PUBLICATIONS

International Search Report, issued in PCT/CN2022/133953, dated Jan. 28, 2023.
(Continued)

*Primary Examiner* — Rodney A Butler
(74) *Attorney, Agent, or Firm* — Zhu Lehnhoff LLP

(57) ABSTRACT

Disclosed in the present disclosure are a dual-motor coupling driving system and a control method therefor. The dual-motor coupling driving system comprises a driving apparatus and a transmission apparatus; the driving apparatus comprises a first motor and a second motor; the first motor and the second motor are coaxially arranged, and an output shaft of the first motor passes through the second motor; the transmission apparatus comprises a first input shaft, a second input shaft, a first gear pair, a second gear pair, a third gear pair, a fourth gear pair, a first clutch unit, a second clutch unit, a first intermediate shaft, a second (Continued)

intermediate shaft, and a system output shaft; the first motor is connected to the first input shaft; the second motor is connected to the second input shaft; the first clutch unit is fixed on the system output shaft; and the second clutch unit is fixed on the second intermediate shaft. According to the present disclosure, dual motors are coaxially arranged, four dual-motor gears are realized by means of four gear pairs, and the dual motors both can participate in transmission, and thus, orderly upshifting without power interruption can be realized in the process of gear shifting.

20 Claims, 4 Drawing Sheets

(51) Int. Cl.
*B60L 15/20* (2006.01)
*F16H 3/00* (2006.01)
*F16H 3/093* (2006.01)
*F16H 61/04* (2006.01)
*F16H 61/688* (2006.01)

(52) U.S. Cl.
CPC ......... *F16H 3/093* (2013.01); *F16H 61/0403* (2013.01); *B60L 2240/12* (2013.01); *B60L 2240/421* (2013.01); *B60L 2240/423* (2013.01); *B60L 2240/486* (2013.01); *F16H 2003/0933* (2013.01); *F16H 2061/0422* (2013.01); *F16H 2200/0021* (2013.01); *F16H 2200/0047* (2013.01)

(58) Field of Classification Search
CPC ..... F16H 2061/0422; F16H 2200/0021; F16H 2200/0047; F16H 3/0915; F16H 63/502; F16H 2200/0034; B60K 1/02; B60K 17/08; B60L 15/20; B60L 2240/12; B60L 2240/421; B60L 2240/423; B60L 2240/486

See application file for complete search history.

(56) References Cited

FOREIGN PATENT DOCUMENTS

| | | |
|---|---|---|
| CN | 212685215 U | 3/2021 |
| CN | 113665353 A | 11/2021 |
| CN | 113696705 A | 11/2021 |
| CN | 215751864 U | 2/2022 |
| CN | 114312270 A | 4/2022 |

OTHER PUBLICATIONS

Written Opinion, issued in PCT/CN2022/133953, dated Jan. 28, 2023.

* cited by examiner

DUAL-MOTOR COUPLING DRIVING SYSTEM AND CONTROL METHOD THEREFOR

FIELD OF THE DISCLOSURE

The disclosure relates to the technical field of transmission of electric vehicles, in particular, to a dual-motor coupling driving system and a control method therefor.

BACKGROUND OF THE DISCLOSURE

In the face of the current severe problems regarding energy structure and carbon emission, development and promotion of pure electric vehicles are of great significance, and China has continued to list same as strategic emerging industries. Pure electric vehicles have been widely used in urban public transportation and other fields, which have shown huge advantages in energy saving and environmental protection. The electric driving system dominated by electric motors is a core component of pure electric vehicles. Compared with traditional vehicles driven by internal combustion engines, its excellent external characteristics of low-speed constant torque and high-speed constant power show great advantages.

At present, the single-motor direct-drive technology solution is generally not limited by the layout space, which causes slight change of the original chassis, and thus it has been widely used in batches. However, its output torque characteristics are limited, and it is difficult to take into account both high torque climbing and high speed; The single motor is matched with the solution of mechanical automatic transmission (AMT) drive. Although it can widen the output torque and speed range well, inherent problems such as shifting shock and interruption of shifting power greatly limit its application scenarios. Dual-motor coupling driving solution can give full play to the potential advantages of the motor drive through coordination between the two motors, but its configuration is generally complicated, which is difficult to control. There is a certain gap between theoretical characteristics and actual application effects. There are many engineering application problems such as system integration design, drive mode design, mode switching control and spatial layout.

The invention patent with the publication number CN106763552A discloses "a dual-motor drive structure." The technology disclosed in this patent is to connect two drive motors to two two-speed transmissions independently, and then couple the power at the output shaft, which can realize two-speed transmission, coaxial power output and direct drive, having a relatively high dynamic performance and efficiency. In addition, when one motor participate in the shifting process, the other motor maintains power output, thereby realizing the driving characteristic without power interruption. Although this solution is structurally integrated, the power transmission paths of the two motors are still relatively independent, and the utilization rate of the gear pairs is not good enough.

The invention patent with the publication number CN111251906B discloses a "dual-motor driving system, gear shift torque control method thereof, and vehicle." The technology disclosed in this patent is to connect two drive motors to the same transmission, with their power coupled on the transmission path, and the orderly shift process is realized through the torque control method, so that when one motor participate in the shifting process, the other motor maintains the power output, achieving the smooth driving without power interruption. Although the configuration of this solution is relatively simple, such solution may cause some interference in the spatial arrangement between the motor and the gear pairs, and it cannot achieve coaxial power output. In addition, there is no direct gear, and the driving quality and driving efficiency are relatively low. In aspect of control, the solution only simply considers whether the motor output torque is equal to the torque required by the vehicle, and it cannot guarantee the quality of the dynamic performance of gear shifting and the comfort of the vehicle.

As can be known from the aforementioned, there will be certain problems in engineering application by adopting the above-mentioned dual-motor drive configuration and control method thereof, or adopting other existing configurations and related control methods.

SUMMARY OF THE DISCLOSURE

In order to solve the above-mentioned problems existing in the prior art, the present disclosure provides a dual-motor coupling driving system and a control method thereof.

The present disclosure discloses a dual-motor coupling driving system, which includes a driving apparatus and a transmission apparatus;

The driving apparatus includes a first motor and a second motor, the first motor and the second motor being arranged coaxially and an output shaft of the first motor passing through the second motor;

The transmission apparatus includes a first input shaft, a second input shaft, a first gear pair, a second gear pair, a third gear pair, a fourth gear pair, a first clutch unit, a second clutch unit, a first intermediate shaft, a second intermediate shaft and a system output shaft, the first motor being connected to the first input shaft, the second motor being connected to the second input shaft, the first clutch unit being fixed on the system output shaft, and the second clutch unit being fixed on the second intermediate shaft, Wherein, when the first motor is working, the first motor inputs power to the first input shaft, and according to a clutch state of the first clutch unit, the first input shaft transfers the power sequentially through the first gear pair, the first intermediate shaft, the second gear pair and the first clutch unit to the system output shaft or directly through the first clutch unit to the system output shaft;

When the second motor is working, the second motor inputs power to the second input shaft, and according to clutch state of the first clutch unit and the second clutch unit, the second input shaft transfers the power sequentially through the third gear pair, the second intermediate shaft, the second clutch unit and the fourth gear pair to the system output shaft, or sequentially through the third gear pair, the second intermediate shaft, the second clutch unit, the first intermediate shaft, the second gear pair and the first clutch unit to the system output shaft, or sequentially through the third gear pair, the second intermediate shaft, the second clutch unit, the first intermediate shaft, the first gear pair and the first clutch unit to the system output shaft.

Preferably, the second motor is an inner rotor motor or an outer rotor motor, wherein if it is an inner rotor motor, an output shaft of the first motor passes through a center of a stator of the second motor; if it is an outer rotor motor, an rotor and an output shaft of the second motor are hollow structure, and the output shaft of the first motor passes through the hollow structure.

Preferably, a driving gear of the first gear pair is sleeved on the first input shaft, and a driven gear of the first gear pair is sleeved on one end of the first intermediate shaft; a driving gear of the second gear pair is sleeved on the other end of the first intermediate shaft, a driven gear of the second gear pair is coaxially arranged with the driving gear of the first gear pair, and the first clutch unit is arranged between the first input shaft and the driven gear of the second gear pair;

Wherein, one end of the system output shaft is connected to the first clutch unit through the driven gear of the second gear pair.

Preferably, a driving gear of the third gear pair is sleeved on the second input shaft, a driven gear of the third gear pair is sleeved on one end of the second intermediate shaft, and the other end of the second intermediate shaft is fixedly connected to the second clutch unit, the second clutch unit is located between the second intermediate shaft and a driving gear of the fourth gear pair, and a driven gear of the fourth gear pair is sleeved on the system output shaft;

Wherein, the first intermediate shaft has a tubular structure, and the second intermediate shaft is coaxially arranged with the first intermediate shaft and is connected to the second clutch unit through the first intermediate shaft.

Preferably, the first motor inputs power to the first input port of the transmission, and the first input shaft transfers the power to the system output shaft sequentially through the first gear pair, the first intermediate shaft, the second gear pair and the first clutch unit, which is defined as first gear;

The first input shaft transfers the power to the system output shaft directly through the first clutch unit, which is defined as fourth gear;

The second input shaft transfers the power to the system output shaft sequentially through the third gear pair, the second intermediate shaft, the second clutch unit, the first intermediate shaft, the second gear pair and the first clutch unit, which is defined as second gear;

The second input shaft transfers the power to the system output shaft sequentially through the third gear pair, the second intermediate shaft, the second clutch unit, the first intermediate shaft, the first gear pair and the first clutch unit, which is defined as third gear;

The second motor inputs power to the second input shaft, and the second input shaft transfers the power to the system output shaft sequentially through the third gear pair, the second intermediate shaft, the second clutch unit and the fourth gear pair, which is defined as fifth gear;

Wherein the transmission ratios from the first gear to the fifth gear are arranged from large to small.

Preferably, both the first motor and the second motor are provided with rotation speed sensors.

Preferably, it also includes a power control unit configured to receive information of the rotation speed sensors, which can control the first motor or the second motor as well as clutch position of the first clutch unit and the second clutch.

The present disclosure also discloses a control method of a dual-motor coupling driving system, which includes:

A first collaborative torque adjustment process: determine number of motors that are working currently; if a single motor is outputting power, keep the power output and directly enter the collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;

The collaborative speed adjustment process: the dual motors enter a rotation speed control mode, wherein the gear holding motor calculates a target rotation speed based on gear ratio and target vehicle speed and maintains the rotation speed value during time period of gear shifting;

The second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

Preferably, in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

Preferably, in the shifting process of the torque control mode or the rotation speed control mode, working gear of only one motor is switched each time.

Compared with prior art, the present disclosure brings about the beneficial effect below:

In the present disclosure, the dual motors are coaxially arranged, and four dual-motor gears are realized by means of four gear pairs, and the dual motors both can participate in transmission, and thus, orderly upshifting without power interruption can be realized in the process of gear shifting.

DETAILED DESCRIPTION OF THE EMBODIMENT(S) OF THE DISCLOSURE

To make the objects, technical solutions, and advantages of the embodiments of the present disclosure clearer, the technical solutions in the embodiments of the present disclosure will be described clearly and completely with reference to the drawings of the embodiments of the present disclosure. Obviously, the embodiments as described is part, rather than all, of the embodiments of the present disclosure. Based on the embodiments of the present disclosure, all other embodiments obtained by those ordinarily skilled in the art without creative efforts shall fall into the protection scope of the present disclosure.

The present disclosure will be described in further detail below with reference to the accompanying drawings:

The disclosure provides a dual-motor coupling driving system and a control method therefor.

Figure 1:
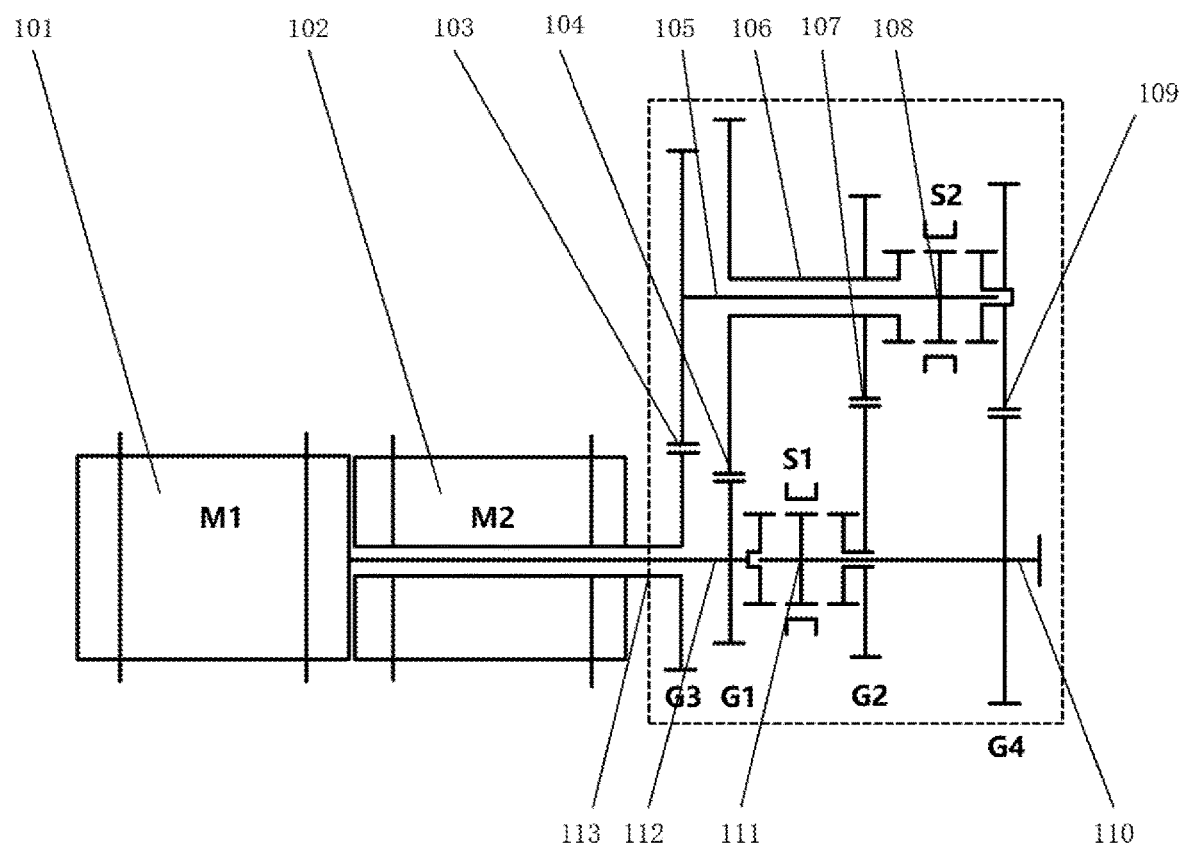
FIG. 1 is a schematic diagram of the configuration of the driving system of the present disclosure.

Referring to FIG. 1, the present disclosure provides a dual-motor coupling driving system including a driving apparatus and a transmission apparatus;

The driving apparatus includes a first motor 101 and a second motor 102. The first motor 101 and the second motor 102 are coaxially arranged and an output shaft of the first motor 101 passes through the second motor 102;

Specifically, the second motor 102 is an inner rotor motor or an outer rotor motor, wherein if it is an inner rotor motor, an output shaft of the first motor 101 passes through a center of a stator of the second motor 102; if it is an outer rotor motor, an rotor and an output shaft of the second motor 102 are hollow structures, and the output shaft of the first motor 101 passes through the hollow structures. Compared with the common single motor drive and the driving form with a single motor matching the transmission, this structure converts the single motor output form into a dual-motor power coupling output form, and the power coupling form is mainly torque coupling. That is, the sum of the peak power of the two motors is approximately equal to the peak power of the original single motor; the sum of the peak torque of the two motors generally can be smaller than the peak torque of the original single motor; the power and torque of the motor can be matched and designed according to the speed ratio of the transmission structure and the vehicle index requirements.

The transmission apparatus includes a first input shaft 112, a second input shaft 113, a first gear pair 104, a second gear pair 107, a third gear pair 103, a fourth gear pair 109, a first clutch unit 111, and a second clutch unit 108, a first intermediate shaft 106, a second intermediate shaft 105 and a system output shaft 110. The first motor 101 is connected to the first input shaft 112, the second motor 102 is connected to the second input shaft 113, the first clutch unit 111 is fixed on the system output shaft 110, and the second clutch unit 108 is fixed on the second intermediate shaft 105, Wherein when the first motor 101 is working, the first motor 101 inputs power to the first input shaft 112. According to a clutch state of the first clutch unit 111, the first input shaft 112 transfers the power sequentially through the first gear pair 104, the first intermediate shaft 106, the second gear pair 107 and the first clutch unit 111 to the system output shaft 110 or directly through the first clutch unit 111 to the system output shaft 110;

Specifically, a driving gear of the first gear pair 104 is sleeved on the first input shaft 112, and a driven gear of the first gear pair 104 is sleeved on one end of the first intermediate shaft 106; a driving gear of the second gear pair 107 is sleeved on the other end of the first intermediate shaft 106, a driven gear of the second gear pair 107 is coaxially arranged with the driving gear of the first gear pair 104, and the first clutch unit 111 is arranged between the first input shaft 112 and the driven gear of the second gear pair 107;

Wherein, one end of the system output shaft 110 is connected to the first clutch unit 111 through the driven gear of the second gear pair 107.

When the second motor 102 is working, the second motor 102 inputs power to the second input shaft 113. According to clutch state of the first clutch unit 111 and the second clutch unit 108, the second input shaft 113 transfers the power sequentially through the third gear pair 103, the second intermediate shaft 105, the second clutch unit 108 and the fourth gear pair 109 to the system output shaft 110, or sequentially through the third gear pair 103, the second intermediate shaft 105, the second clutch unit 108, the first intermediate shaft 106, the second gear pair 107 and the first clutch unit 111 to the system output shaft 110, or sequentially through the third gear pair 103, the second intermediate shaft 105, the second clutch unit 108, the first intermediate shaft 106, the first gear pair 104 and the first clutch unit 111 to the system output shaft 110.

Specifically, a driving gear of the third gear pair 103 is sleeved on the second input shaft 113, a driven gear of the third gear pair 103 is sleeved on one end of the second intermediate shaft 105, and the other end of the second intermediate shaft 105 is fixedly connected to the second clutch unit 108, the second clutch unit 108 is located between the second intermediate shaft 105 and a driving gear of the fourth gear pair 109, and a driven gear of the fourth gear pair 109 is sleeved on the system output shaft 110;

Wherein the first intermediate shaft 106 has a tubular structure, and the second intermediate shaft 105 is coaxially arranged with the first intermediate shaft 106 and is connected to the second clutch unit 108 through the first intermediate shaft 106. Through the above-mentioned structure, the first motor 101 passes through the second motor 102, that is, they are superimposed at the input end, so as to realize the deep coaxial coupling of the output power of the dual motors. That is, the transmission apparatus adopts a parallel-shaft three-shaft transmission, including two bidirectional clutch devices and four pairs of gear pairs.

Figure 2:
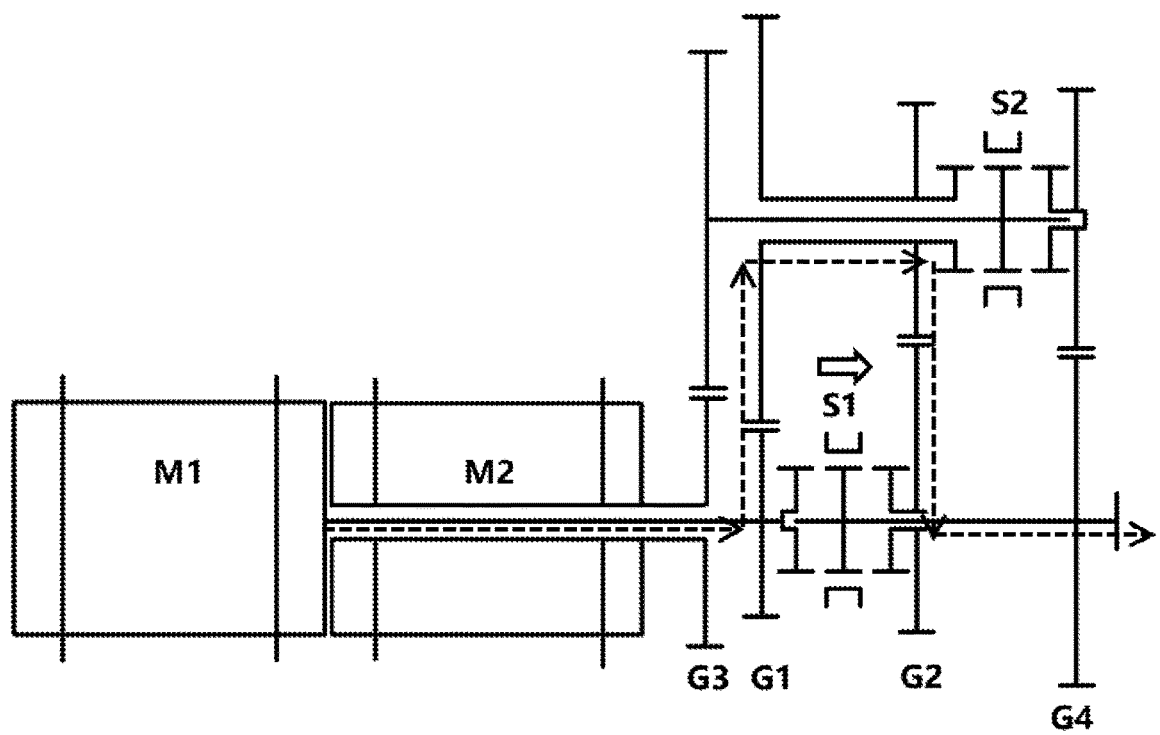
FIG. 2 shows the power transmission path of the first motor of the driving system corresponding to the first gear in the present disclosure.
Figure 3:
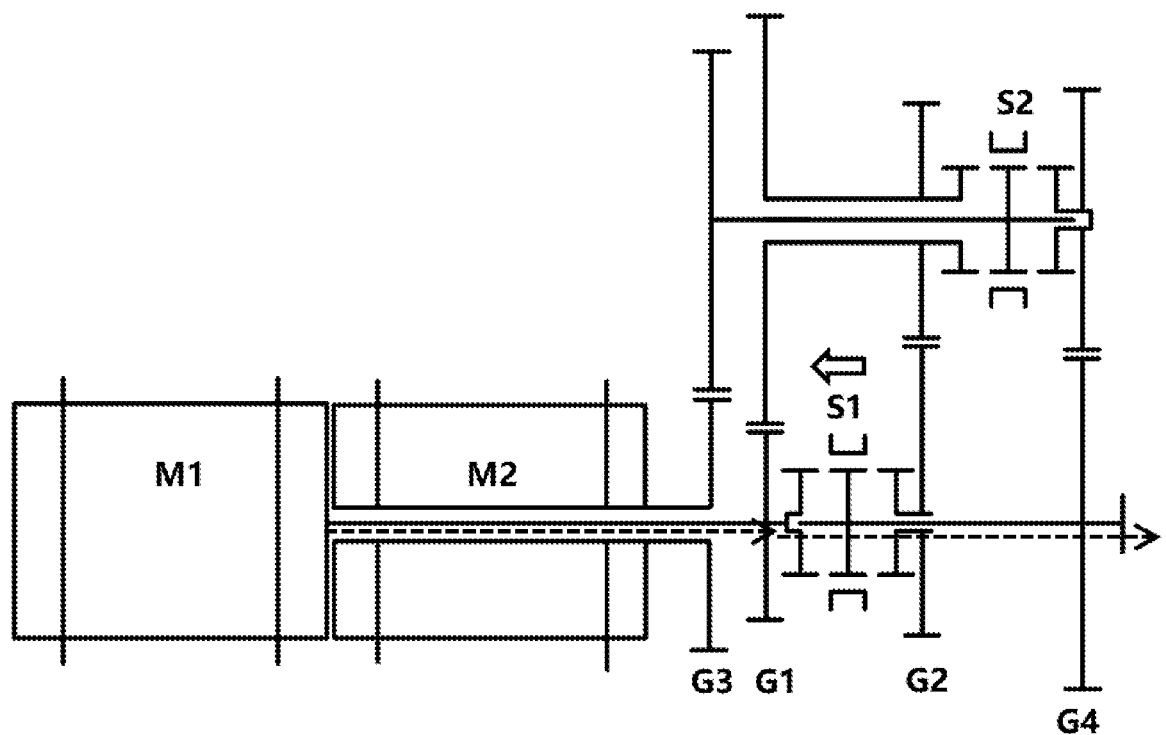
FIG. 3 shows the power transmission path of the first motor of the driving system corresponding to the fourth gear in the present disclosure.
Figure 4:
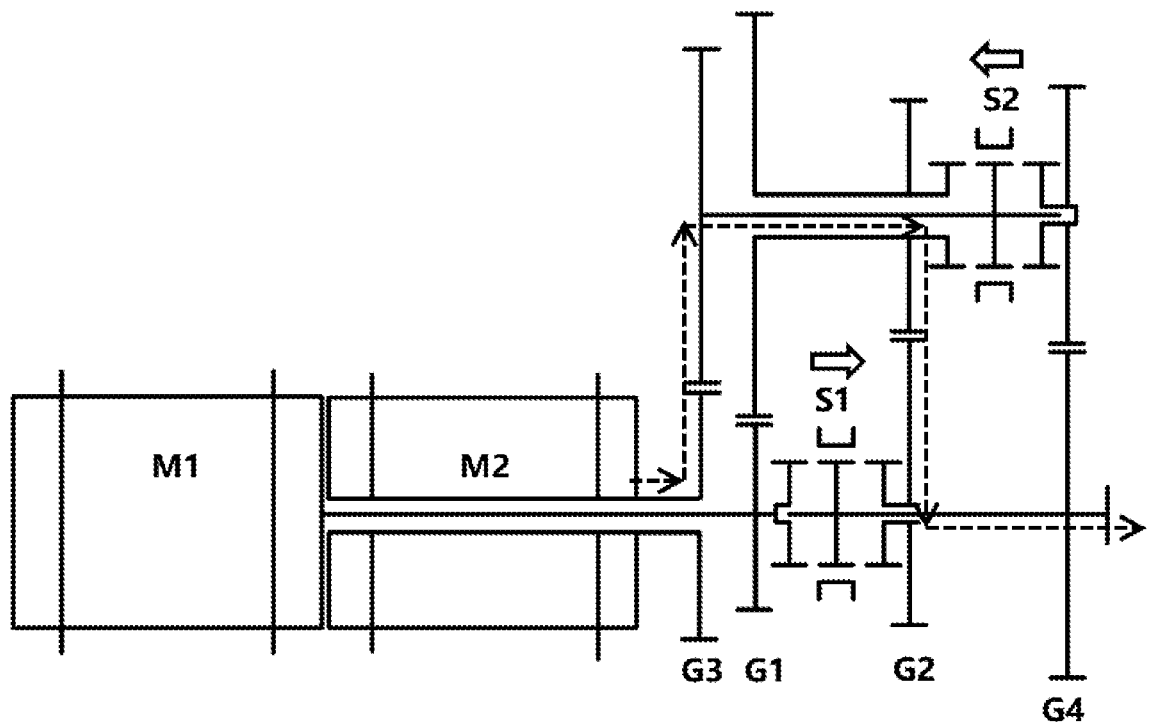
FIG. 4 shows the power transmission path of the second motor of the driving system corresponding to the second gear in the present disclosure.
Figure 5:
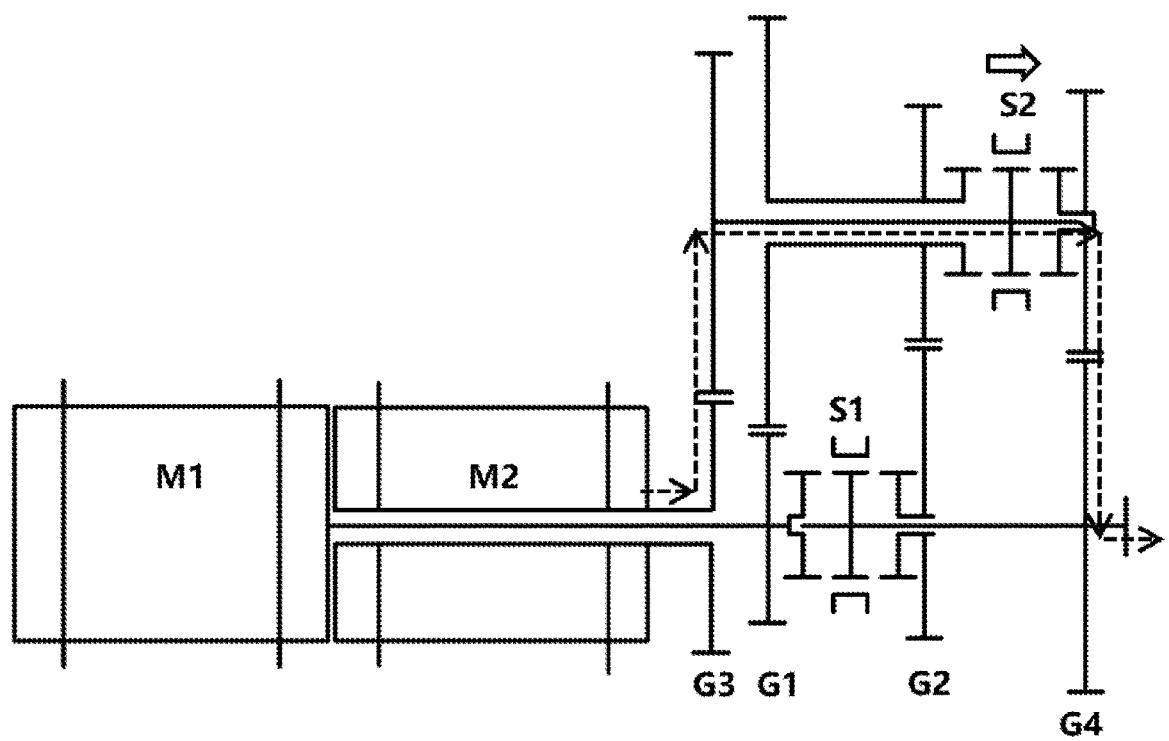
FIG. 5 shows the power transmission path of the second motor of the driving system corresponding to the third gear in the present disclosure.
Figure 6:
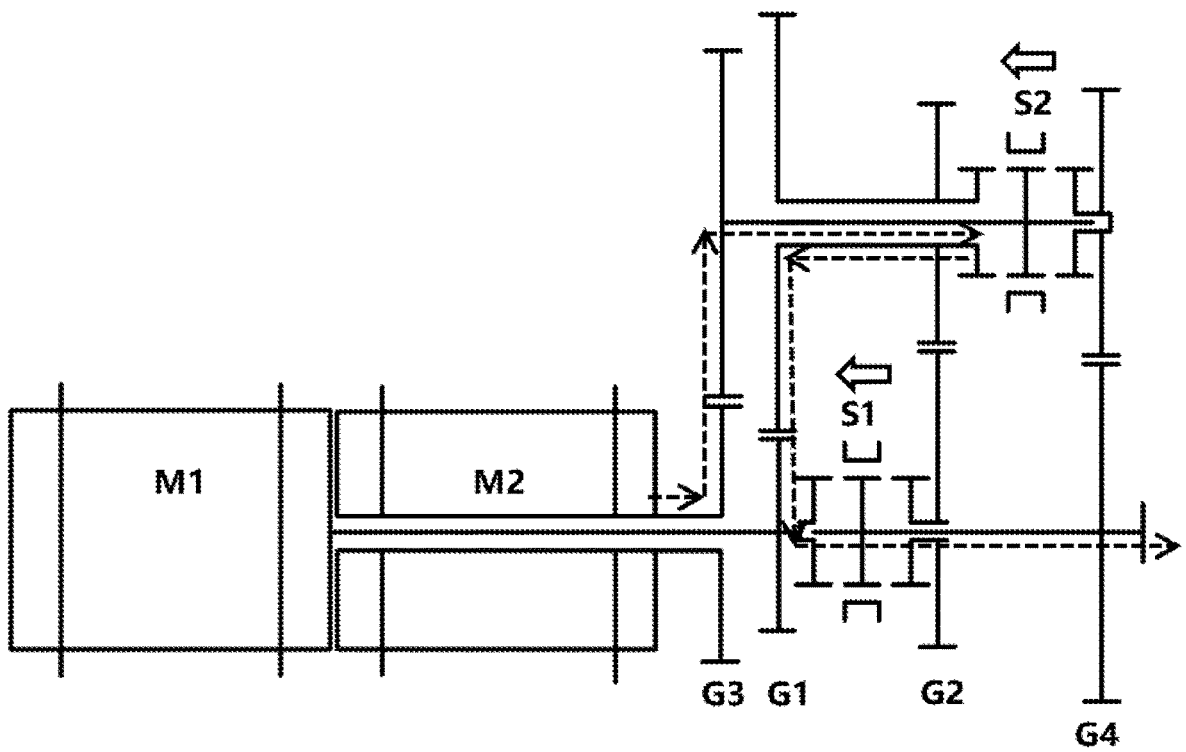
FIG. 6 shows the power transmission path of the second motor of the driving system corresponding to the fifth gear in the present disclosure.

Referring to FIG. 2, the first motor 101 inputs power to the first input, and the first input shaft 112 transfers the power sequentially through the first gear pair 104, the first intermediate shaft 106, the second gear pair 107 and the first clutch unit 111 to the system output shaft 110, which is defined as first gear;

Referring to FIG. 3, the first input shaft 112 directly transfers the power to the system output shaft 110 through the first clutch unit 111, which is defined as the fourth gear;

Referring to FIG. 4, the second input shaft 113 transfers the power sequentially through the third gear pair 103, the second intermediate shaft 105, the second clutch unit 108, the first intermediate shaft 106, the second gear pair 107 and the first clutch unit 111 to the system output shaft 110, which is defined as second gear;

Referring to FIG. 5, the second input shaft 113 transfers the power sequentially through the third gear pair 103, the second intermediate shaft 105, the second clutch unit 108, the first intermediate shaft 106, the first gear pair 104 and the first clutch unit 111 to the system output shaft 110, which is defined as third gear;

Referring to FIG. 6, the second motor 102 inputs power to the second input shaft 113, and the second input shaft 113 transfers the power sequentially through the third gear pair 103, the second intermediate shaft 105, the second clutch unit 108 and the fourth gear pair 109 to the system output shaft 110, which is defined as the fifth gear;

Wherein the transmission ratios of the first gear to the fifth gear are arranged from large to small.

The power transmission paths of the above gears are summarized in the table below.

| Gear | Gear pair | Source of power | First clutch unit 111 | Second clutch unit |
|---|---|---|---|---|
| First gear | G1 × G2 | M1 | → | / |
| Second gear | G3 × G2 | M2 | → | ← |
| Third gear | G3 × G4 | M2 | / | → |
| Fourth gear | Direct gear | M1 | ← | / |
| Fifth gear | G3 × 1/G1 | M2 | ← | ← |

In the table, G1, G2, G3, and G4 are respectively the first gear pair 104, the second gear pair 107, the third gear pair 103 and the fourth gear pair 109; M1 and M2 are respectively the first motor 101 and the second motor 102; → means moving to the right; ← means moving to the left; and/means not working. It can be seen from the table that through the gear combination design, on the premise of ensuring that the power output meets demand of the whole vehicle and shift without interruption, the gear pairs in the transmission apparatus are utilized maximally, making the assembly structure more compact and realizing higher utilization rate of mechanical components. A variety of effective modes can be achieved by combining the above power transmission paths in a reasonable and orderly manner.

In this embodiment, under the coordinated operation of the dual motors, four effective dual-motor driving modes can be realized, and orderly shift without power interruption can be realized among the modes.

The meaning of the above "orderly" is that the comprehensive transmission speed ratio of the system can be changed from large to small sequentially in each mode; the meaning "without power interruption" is that in the mode switching process, there is always a motor for power output, that is, the system output shaft 110110 can always respond to the power demand of the whole vehicle. The specific combinations of the four modes are:

Dual-motor mode 1: The first motor 101101 works in the first gear, and the second motor 102102 works in second gear;

Dual-motor mode 2: The first motor 101101 works in the first gear, and the second motor 102102 works in the third gear;

Dual-motor mode 3: the first motor 101101 works in the fourth gear, and the second motor 102102 works in the third gear;

Dual-motor mode 4: the first motor 101101 works in the fourth gear, and the second motor 102102 works in the fifth gear;

The above modes and shifting process can be summarized as shown in the following table.

| No. | Mode | First motor 101 | Second motor 102 | First clutch unit 111 | Second clutch unit 108 |
|---|---|---|---|---|---|
| 1 | Dual-motor mode 1 | First gear torque mode | Second gear torque mode | → | ← |
| 2 | Single motor mode | First gear torque mode | Speed adjustment mode | → | 0 |
| 3 | Dual-motor mode 2 | First gear torque mode | Third gear torque mode | → | → |
| 4 | Single motor mode | Speed adjustment mode | Third gear torque mode | / | → |
| 5 | Dual-motor mode 3 | Fourth gear torque mode | Third gear torque mode | ← | → |
| 6 | Single motor mode | Fourth gear torque mode | Speed adjustment mode | ← | 0 |
| 7 | Dual-motor mode 4 | Fourth gear torque mode | Fifth gear torque mode | ← | ← |

In this embodiment, both the first motor 101 and the second motor 102 are provided with rotation speed sensors. The speed sensors are packaged inside the power coupling device. The speed of each shaft collected by the rotation sensors is an important signal that needs to be referenced when making gear shifting decisions.

Further, both the first clutch unit 111 and the second clutch unit 108 include an actuator that can drive movement thereof, and the actuator enables them to move along an axis direction of the coupling sleeve. The power source of the actuator can be an electromagnetic suction, motor driving, hydraulic transmission or pneumatic transmission, etc.

In this embodiment, a power control unit is further provided, which is configured to receive information from the rotation speed sensors, and can control the first motor 101 or the second motor 102 and control clutch positions of the first clutch unit 111 and the second clutch unit 108.

Specifically, the Traction Control Unit (TCU) can communicate with the Vehicle Control Unit (VCU), receive control commands, pedal opening degree and other information from the VCU and comprehensively determine the current driving force distribution and driving mode strategy, and feedback the current driving status information of the whole vehicle; it can communicate with the Motor Control Unit (MCU) and send commands such as target torque to the motors for drive or speed control; at the same time, it can regulate the above-mentioned actuators, and complete the clutch combination action according to the preset strategy under certain conditions.

In this embodiment, the system uses an independent internal CAN communication network (CAN2), which can perform differential rate communication with the original CAN communication network (CAN1) of the vehicle to avoid unnecessary communication redundancy. The nodes connected to CAN2 include TCU, MCU, and VCU, wherein TCU is the main control node of CAN2. The nodes connected to CAN1 include VCU, BMS, ICU, accelerator pedal, brake pedal and other modules required for the whole vehicle. VCU can realize the forwarding of information on CAN1 and CAN2.

Figure 7:
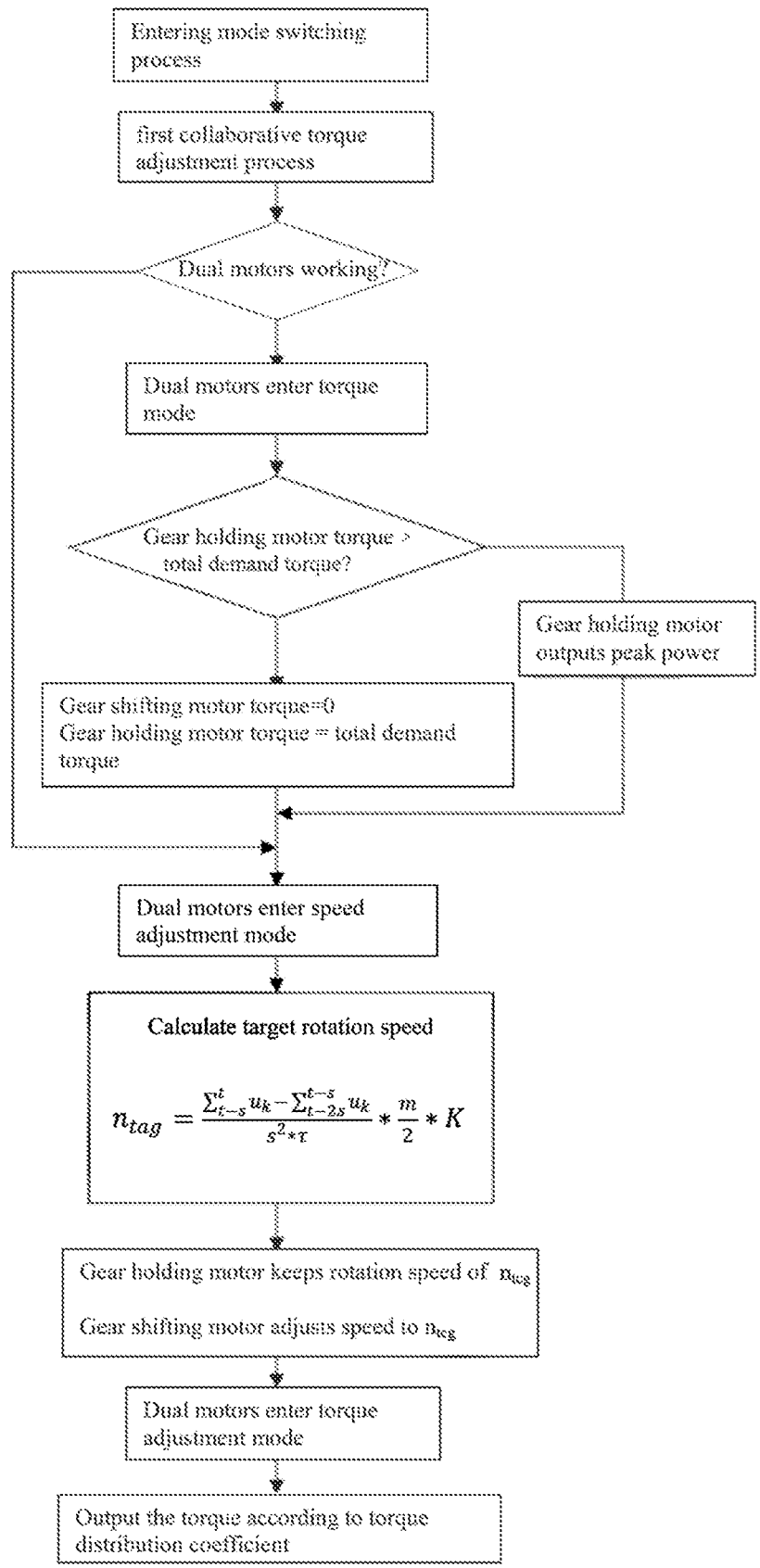
FIG. 7 is a flow chart of the control method of the driving system in the present disclosure.

Referring to FIG. 7, the present disclosure also discloses a control method for a dual-motor coupling driving system. The control method is preset in the above-mentioned power control unit TCU, and the TCU is responsible for specific online calculation execution, and cooperates with other control units such as VCU to complete the entire control process, specifically including:

A first collaborative torque adjustment process: determine number of motors that are working currently; if a single motor is outputting power, keep the power output and directly enter a collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;

The collaborative speed adjustment process: the dual motors enter a rotation speed control mode, wherein the gear holding motor calculates a target rotation speed based on gear ratio and target vehicle speed and maintains the rotation speed value during time period of gear shifting; and A second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

Preferably, in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

In this embodiment, in the switching process of the torque control mode or the rotation speed control mode, working gear of only one motor is switched each time.

As can be seen from the aforementioned, there are obvious differences between the present disclosure and the dual-motor drive in the prior art, specifically:

The existing solution I is to arrange two motors coaxially, with one motor torque connected to the front end of the transmission and the other motor connected to the rear end of the transmission. This solution can realize gear (mode) switching without power interruption, can realize direct gear, and can realize n dual-motor gears (modes) through n pairs of gear pairs. However, the transmission of this solution can only work on the motor connected to its front end, that is, only one motor can work for transmission, which has a limited output torque and cannot exert the maximum driving potential of the dual motors;

The existing solution II is to arrange the two motors coaxially, and then connect the two motors to the front end of the transmission after torque coupling. This solution allows the dual motors to participate in transmission, can realize direct gears, and can realize n dual-motor gears (modes) through n pairs of gear pairs. However, in the gear (mode) shifting process of this solution, the power of the two motors will inevitably be interrupted at the same time, that is, it is impossible to achieve continuous power output without power interruption;

The existing solution III is to connect two motors to two transmissions respectively, and then torque-couple the output power at the output end of the transmissions. The specific layout can be divided into coaxial type and parallel (parallel) type. In this solution, the two motors can both achieve transmission, and can achieve gear (mode) shifting without power interruption. However, in order to realize n dual-motor gears (modes), this solution requires at least n+1 pairs of gear pairs, that is, the transmission can only act on the corresponding motor alone, which to a certain extent results in a waste of functions of the gear pairs; at the same time, this solution cannot achieve orderly, power-interrupted shifting when shifting between dual-motor gears (modes), that is, no matter how designed, the speed ratio corresponding to the gear (mode) shifting sequence without power interruption cannot be increased from small to large, and thus it is difficult to achieve the theoretical number of gears (modes) in practical applications;

The present disclosure can solve the deficiencies in the above-mentioned existing solutions, that is, the dual motors of the present disclosure can participate in the transmission; the coaxial arrangement of the dual motors can realize direct gearing; four pairs of gear pairs can be used to realize four dual-motor gears (modes); in the gear (mode) shifting process, orderly shifting without power interruption can be achieved; only two clutches are used to achieve four dual-motor gears (modes), and no additional clutches are added. The control method of the present disclosure can maximize the power performance of the system and the advantages of coordinated adjustment of dual-motor torque and speed, and can improve the speed regulation accuracy and speed regulation time in the process of large speed difference speed regulation, thereby improving the vehicle's performance of comfort.

The above are only preferred embodiments of the present disclosure and are not intended to limit the present disclosure. For those skilled in the art, the present disclosure may have various modifications and changes. Any modification, equivalent replacement, improvement, etc. made within the spirit and principle of the present disclosure shall be included in the protection scope of the present disclosure.

The invention claimed is:

1. A dual-motor coupling driving system, characterized in comprising a driving apparatus and a transmission apparatus;

the driving apparatus comprises a first motor and a second motor, the first motor and the second motor being arranged coaxially and an output shaft of the first motor passing through the second motor;

the transmission apparatus comprises a first input shaft, a second input shaft, a first gear pair, a second gear pair, a third gear pair, a fourth gear pair, a first clutch unit, a second clutch unit, a first intermediate shaft, a second intermediate shaft and a system output shaft, the first motor being connected to the first input shaft, the second motor being connected to the second input shaft, the first clutch unit being fixed on the system output shaft, and the second clutch unit being fixed on the second intermediate shaft, wherein, when the first motor is working, the first motor inputs power to the first input shaft, and according to a clutch state of the first clutch unit, the first input shaft transfers the power sequentially through the first gear pair, the first intermediate shaft, the second gear pair and the first clutch unit to the system output shaft or directly through the first clutch unit to the system output shaft;

when the second motor is working, the second motor inputs power to the second input shaft, and according to clutch state of the first clutch unit and the second clutch unit, the second input shaft transfers the power sequentially through the third gear pair, the second intermediate shaft, the second clutch unit and the fourth gear pair to the system output shaft, or sequentially through the third gear pair, the second intermediate shaft, the second clutch unit, the first intermediate shaft, the second gear pair and the first clutch unit to the system output shaft, or sequentially through the third gear pair, the second intermediate shaft, the second clutch unit, the first intermediate shaft, the first gear pair and the first clutch unit to the system output shaft.

2. The dual-motor coupling driving system according to claim 1, characterized in that the second motor is an inner rotor motor or an outer rotor motor, wherein if it is an inner rotor motor, an output shaft of the first motor passes through a center of a stator of the second motor; if it is an outer rotor motor, an rotor and an output shaft of the second motor are hollow structures, and the output shaft of the first motor passes through the hollow structures.

3. The dual-motor coupling driving system according to claim 1, characterized in that a driving gear of the first gear pair is sleeved on the first input shaft, and a driven gear of the first gear pair is sleeved on one end of the first intermediate shaft; a driving gear of the second gear pair is sleeved on the other end of the first intermediate shaft, a driven gear of the second gear pair is coaxially arranged with the driving gear of the first gear pair, and the first clutch unit is arranged between the first input shaft and the driven gear of the second gear pair;

wherein, one end of the system output shaft is connected to the first clutch unit through the driven gear of the second gear pair.

4. The dual-motor coupling driving system according to claim 1, characterized in that a driving gear of the third gear pair is sleeved on the second input shaft, a driven gear of the third gear pair is sleeved on one end of the second intermediate shaft, and the other end of the second intermediate shaft is fixedly connected to the second clutch unit, the second clutch unit is located between the second intermediate shaft and a driving gear of the fourth gear pair, and a driven gear of the fourth gear pair is sleeved on the system output shaft;

wherein, the first intermediate shaft has a tubular structure, and the second intermediate shaft is coaxially arranged with the first intermediate shaft and is connected to the second clutch unit through the first intermediate shaft.

5. The dual-motor coupling driving system according to claim 4, characterized in that the first motor inputs power to the first input, and the first input shaft transfers the power to the system output shaft sequentially through the first gear pair, the first intermediate shaft, the second gear pair and the first clutch unit, which is defined as first gear;

the first input shaft transfers the power to the system output shaft directly through the first clutch unit, which is defined as fourth gear;

the second input shaft transfers the power to the system output shaft sequentially through the third gear pair, the second intermediate shaft, the second clutch unit, the first intermediate shaft, the second gear pair and the first clutch unit, which is defined as second gear;

the second input shaft transfers the power to the system output shaft sequentially through the third gear pair, the second intermediate shaft, the second clutch unit, the first intermediate shaft, the first gear pair and the first clutch unit, which is defined as third gear;

the second motor inputs power to the second input shaft, and the second input shaft transfers the power to the system output shaft sequentially through the third gear pair, the second intermediate shaft, the second clutch unit and the fourth gear pair, which is defined as fifth gear;

wherein the transmission ratios from the first gear to the fifth gear are arranged from large to small.

6. The dual-motor coupling driving system according to claim 1, characterized in that both the first motor and the second motor are provided with rotation speed sensors.

7. The dual-motor coupling driving system according to claim 6, characterized in further comprising a power control unit configured to receive information of the rotation speed sensors, which can control the first motor or the second motor as well as clutch position of the first clutch unit and the second clutch.

8. A control method of a dual-motor coupling driving system according to claim 7, characterized in comprising:

a first collaborative torque adjustment process: determine number of motors that are working currently; if a single motor is outputting power, keep the power output and directly enter a collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;

collaborative speed adjustment process: the dual motors enter a rotation speed control mode, wherein the gear holding motor calculates a target rotation speed based on gear ratio and target vehicle speed and maintains the rotation speed value during time period of gear shifting; and a second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

9. The control method of a dual-motor coupling driving system according to claim 8, wherein in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

10. The control method of a dual-motor coupling driving system according to claim 8, wherein in the shifting process of the torque control mode or the rotation speed control mode, working gear of only one motor is switched each time.

11. A control method of a dual-motor coupling driving system according to claim 6, characterized in comprising:
- a first collaborative torque adjustment process: determine number of motors that are working currently; if a single motor is outputting power, keep the power output and directly enter a collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;
- collaborative speed adjustment process: the dual motors enter a rotation speed control mode, wherein the gear holding motor calculates a target rotation speed based on gear ratio and target vehicle speed and maintains the rotation speed value during time period of gear shifting; and
- a second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

12. The control method of a dual-motor coupling driving system according to claim 11, wherein in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

13. The control method of a dual-motor coupling driving system according to claim 11, wherein in the shifting process of the torque control mode or the rotation speed control mode, working gear of only one motor is switched each time.

14. A control method of a dual-motor coupling driving system according to claim 5, characterized in comprising:
- a first collaborative torque adjustment process: determine number of motors that are working currently; if a single motor is outputting power, keep the power output and directly enter a collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;
- collaborative speed adjustment process: the dual motors enter a rotation speed control mode, wherein the gear holding motor calculates a target rotation speed based on gear ratio and target vehicle speed and maintains the rotation speed value during time period of gear shifting; and
- a second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

15. The control method of a dual-motor coupling driving system according to claim 14, wherein in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

16. The control method of a dual-motor coupling driving system according to claim 14, wherein in the shifting process of the torque control mode or the rotation speed control mode, working gear of only one motor is switched each time.

17. A control method of a dual-motor coupling driving system according to claim 2, characterized in comprising:
- a first collaborative torque adjustment process: determine number of motors that are working currently; if a single motor is outputting power, keep the power output and directly enter a collaborative speed adjustment process; if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;
- collaborative speed adjustment process: the dual motors enter a rotation speed control mode, wherein the gear holding motor calculates a target rotation speed based on gear ratio and target vehicle speed and maintains the rotation speed value during time period of gear shifting; and
- a second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

18. A control method of a dual-motor coupling driving system according to claim 1, characterized in comprising:
- a first collaborative torque adjustment process: determine number of motors that are working currently; if a single motor is outputting power, keep the power output and directly enter a collaborative speed adjustment process;

if dual motors are outputting power, the two motors will enter a torque control mode, gradually reducing output torque of the gear shifting motor to zero, and synchronously increasing output torque of the gear holding motor to a total demand torque; if the total demand torque is greater than current peak torque value of the gear holding motor, output torque with the current peak torque value, and after adjustment is completed with the torque control mode, enter the collaborative speed adjustment process;

collaborative speed adjustment process: the dual motors enter a rotation speed control mode, wherein the gear holding motor calculates a target rotation speed based on gear ratio and target vehicle speed and maintains the rotation speed value during time period of gear shifting; and a second collaborative torque adjustment process: the dual motors enter a torque control mode, increasing an output torque of the gear shifting motor, and synchronously reducing an output torque of the gear holding motor, so that a sum of the two torques is equal to the total demand torque, and distributing same according to a torque distribution coefficient.

19. The control method of a dual-motor coupling driving system according to claim 18, wherein in the collaborative speed adjustment process, formula for calculating the target rotation speed and maintaining the rotation speed value within the time of gear shifting is:

$$n_{tag} = \frac{\sum_{t-s}^{t} u_k - \sum_{t-2s}^{t-s} u_k}{s^2} * \frac{m}{2} * K$$

wherein t is the moment; $n_{tag}$ is the target rotation speed; s is calculation threshold of vehicle speed; $u_k$ is the vehicle speed; m is the time of gear shifting; K is a conversion coefficient between the vehicle speed and the motor speed.

20. The control method of a dual-motor coupling driving system according to claim 18, wherein in the shifting process of the torque control mode or the rotation speed control mode, working gear of only one motor is switched each time.

* * * * *